(12) United States Patent
Buuck et al.

(10) Patent No.: US 9,285,905 B1
(45) Date of Patent: Mar. 15, 2016

(54) ACTUATOR COUPLED DEVICE CHASSIS

(71) Applicant: AMAZON TECHNOLOGIES, INC., Reno, NV (US)

(72) Inventors: David Charles Buuck, Prunedale, CA (US); Tiffany Ann Yun, Fremont, CA (US); Sukwon Noh, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 163 days.

(21) Appl. No.: 13/803,573

(22) Filed: Mar. 14, 2013

(51) Int. Cl.
*G06F 3/041* (2006.01)

(52) U.S. Cl.
CPC ...................................... *G06F 3/041* (2013.01)

(58) Field of Classification Search
None
See application file for complete search history.

(56) References Cited

U.S. PATENT DOCUMENTS

| | | | | |
|---|---|---|---|---|
| 6,954,658 | B2* | 10/2005 | Engstrom et al. | 455/567 |
| 2010/0090813 | A1* | 4/2010 | Je et al. | 340/407.2 |
| 2010/0156818 | A1* | 6/2010 | Burrough et al. | 345/173 |
| 2014/0232657 | A1* | 8/2014 | Aviles et al. | 345/173 |

\* cited by examiner

*Primary Examiner* — Nicholas Lee
*Assistant Examiner* — Duane N Taylor, Jr.
(74) *Attorney, Agent, or Firm* — Lindauer Law, PLLC

(57) ABSTRACT

Various techniques are described for presenting haptic effects in a user device. The user device may include an outer shell and an inner device comprising one or more electronic components. The inner device may be suspended inside a cavity formed by the outer shell, and the inner device may be coupled to the outer shell by one or more haptic actuators situated between the inner device and the outer shell. The outer shell may substantially enclose the inner device, while leaving a touch sensor-enabled display accessible to a user. Based on touch inputs to the display, or other input events, control signals may be sent to the haptic actuator(s) to generate a relative motion between the inner device and the outer shell, the relative motion providing a haptic effect.

20 Claims, 12 Drawing Sheets

ACTUATOR COUPLED DEVICE CHASSIS

BACKGROUND

With the increasing popularity of mobile devices such as smartphones, electronic book readers, tablet computers, and so forth, more users are consuming content, playing games, or performing other types of tasks on mobile devices. Unfortunately, a user's experience when consuming content on a mobile device may not be as rich as the experience when consuming media on a traditional system, due to limited output capabilities of currently available mobile devices.

Figure 1:
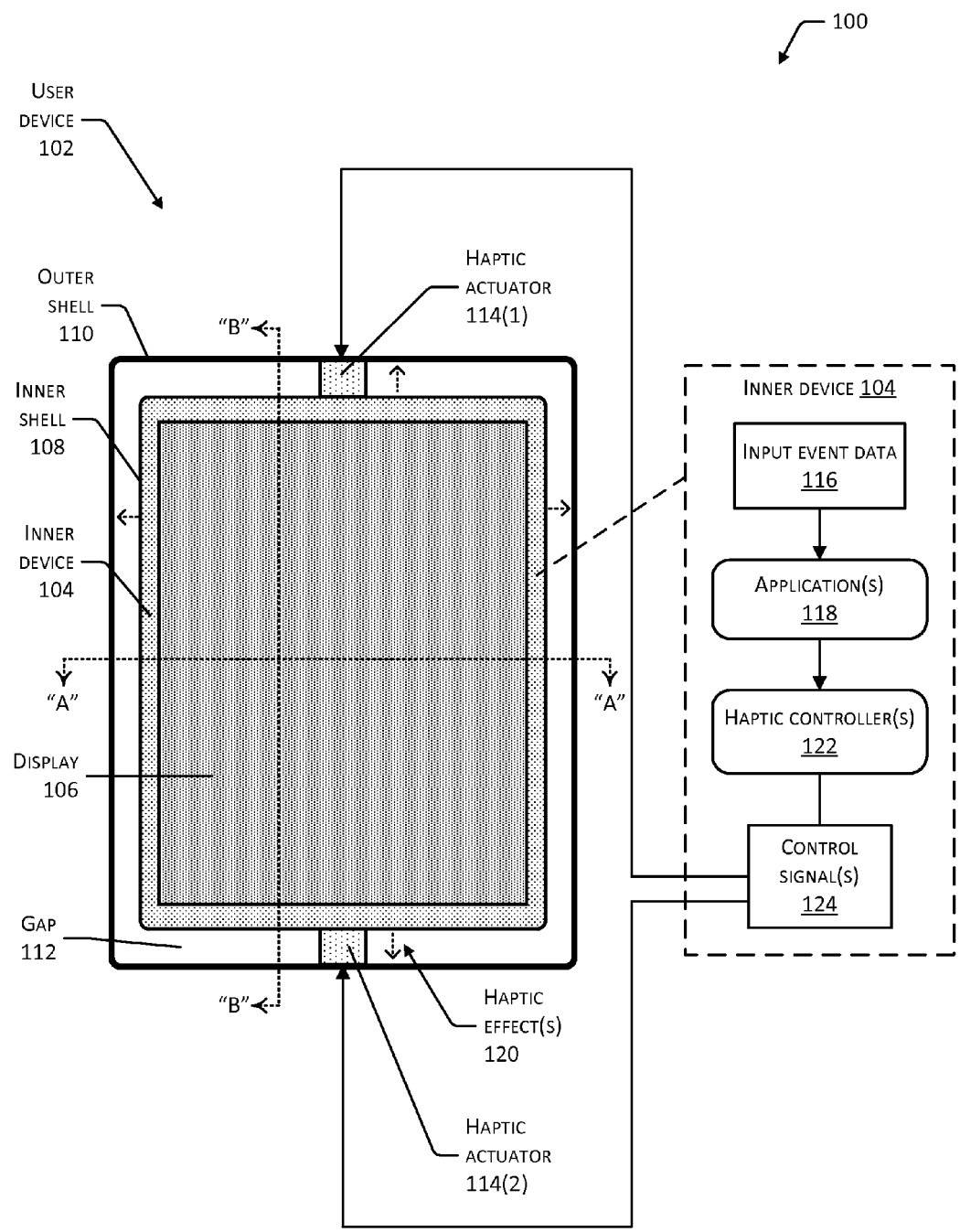
FIG. 1 depicts a planar view of a user device configured to present haptic effects through relative motion of an inner device and an outer shell, including at least two haptic actuators to generate the relative motion in response to an input event.
Figure 1:
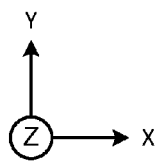

Certain implementations and embodiments are described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes embodiments of systems, devices, methods, and computer-readable media for presenting haptic effects to provide a richer experience for device users. In some devices haptic effects may be presented through a movement that displaces one component relative to another. For example, in some devices a touch input-enabled display may be displaced relative to other internal components of the device, to provide a haptic feedback for a touch input to the display. However, such relative motions between internal components of a device may cause a physical strain on mechanical or electrical couplings within the device.

In the implementations described herein, one or more haptic actuators provide for a motion of an entire inner device, or a substantial portion of its components, thus enabling the presentation of haptic effects while reducing or avoiding a strain on mechanical or electrical couplings in the inner device. In some implementations, a user device includes an outer shell and an inner device, the outer shell substantially enclosing the inner device. The inner device may comprise one or more electronic components, and may itself function as a computing device or other electronic device. The inner device may be coupled to the outer shell by one or more haptic actuators that are situated between the outer shell and the inner device. On receiving a control signal from at least one of the electronic components, such as a haptic controller, the haptic actuators may generate a relative motion or displacement between the inner device and the outer shell, presenting a haptic effect that may be perceivable to a user.

In some implementations, the outer shell may substantially cover or enclose those portions of the inner device that do not receive inputs from a user or from other device. For example, the outer shell may substantially cover or enclose all the sides of the inner device except for at least one side that includes a touch-sensitive display. Accordingly, implementations may enable user inputs to a touch-sensitive display, and may enable information to be presented on such a display. In some implementations, the outer shell may also include one or more ports, holes, or gaps, enabling the inner device to access external power sources or communicate with external devices or peripherals. In some cases, the outer shell may substantially resemble the shape and size of the inner device, such that a user is not aware that the outer shell is present. The outer shell may be coupled to the inner device through the haptic actuator(s). Alternatively, the outer shell may be at least a portion of a removable case, such as an accessory that may be used to generate haptic effects.

The haptic actuator(s) may generate relative motions between the outer shell and the inner device, to present haptic effects as vibro-tactile or inertial feedback for user inputs entered through a touch-sensitive display or another touch input device that is a component of the inner device. In some implementations, the haptic effects may be generated through relative motions in a transverse direction that is substantially parallel to a plane of the display or other touch input device, to minimize sound that may otherwise be generated through movements in a perpendicular direction. The plane of the display or other touch input device may be defined by the two longest axes or dimensions of the display or touch input device.

As used in this disclosure, haptic effects refer to effects that are presented to a user as tactile feedback while the user is touching or otherwise interacting with a device. Haptic effects include forces, vibrations, motions, or sensations that are perceivable by the user through mechanoreceptor nerves or other elements of the human nervous system.

FIG. 1 depicts a schematic 100 showing a planar view of a user device 102 configured to present haptic effects through relative motion of an inner device and an outer shell, including at least two haptic actuators to generate the relative motion in response to an input event. FIGS. 1, 2, and 7-10 include a reference to a coordinate system, including X, Y, and Z directions that are orthogonal to one another.

The user device 102 may include any type of mobile computing device such as smartphones, personal data assistants (PDAs), tablet computers, wearable computers, mobile gaming devices, gaming console controllers, automotive computers, electronic book readers, implanted computers, portable music players, and so forth. The user device 102 may also include other types of computing devices such as desktop computers, personal computers, laptop computers, thin clients, terminals, game consoles, smart appliances, home entertainment components, server computers, mainframe computers, cloud computing devices, and so forth.

The user device 102 may include an inner device 104, including one or more electronic components or other elements. The inner device 104 is described further with respect to FIG. 3. Although examples herein describe the user device 102 as including one inner device 104, implementations are not so limited. Accordingly, in some implementations the user device 102 may include multiple inner devices 104.

In some implementations, the inner device 104 includes a display 106, which may be any type of display device that employs any technology to present visual information to a user of the user device 102. The display 106 may include, but is not limited to, liquid crystal displays (LCDs), light-emitting diode (LED) displays, electrophoretic display technologies such as electronic paper or e-ink, and so forth. In some implementations, the inner device 104 may include more than one display 106. The user device 102 may also include devices that do not have a display (e.g., headless devices), such as music players, haptic notification devices, vibrating pagers, and so forth.

The inner device 104 may include an inner shell 108 that substantially surrounds or encloses the various components of the inner device 104. The user device 102 may also include an outer shell 110 that substantially surrounds or encloses at least a portion of the inner device 104 and its inner shell 108. The inner shell 108 and the outer shell 110 may be composed of one or more materials of any type. In some implementations, one or both of the inner shell 108 and the outer shell 110 may comprise a carbon fiber material. In some cases, the outer shell 110 may be at least partly composed of a material that is transparent, enabling a user to see one or more components of the inner device 104.

In implementations, the inner shell 108 and the outer shell 110 are separated by a gap 112, a substantially empty space that provides clearance for movements of the inner device 104 relative to the outer shell 110. Implementations may include one or more haptic actuators 114 situated in the gap 112 between the inner shell 108 and the outer shell 110. In implementations, each of the haptic actuator(s) 114 is coupled to an outer surface of the inner shell 108 and coupled to an inner surface of the outer shell 110. Accordingly, the width of the gap 112 may correspond to a dimension of the haptic actuator(s) 114, within a particular tolerance or margin of error. For example, in some cases the haptic actuator(s) 114 may include microelectricalmechanical systems (MEMS) that have a width on the order of hundreds of microns or micrometers, and the gap 112 may also be on the order of hundreds of microns. Alternatively, the width of the gap 112 may correspond to a range of motion of the inner device 104, and the gap 112 may provide clearance for the movement of the inner device 104 relative to the outer shell 110.

In some implementations, one or more portions of the inner shell 108 or the outer shell 110 may be substantially flat where they are coupled to one or more haptic actuators 114. Such flat surfaces may provide a reliable mechanical coupling from the haptic actuator(s) 114 to the inner shell 108 or the outer shell 110, and may provide for an efficient transfer of force from the haptic actuator(s) 114 to the inner shell 108 or to the outer shell 110.

As used herein, coupling may refer to a direct contact of a first component with a second component such that force may be transferred between the first and second components. Coupling may also refer to an indirect contact of a first component with a second component, with one or more structures or materials situated between the components or intermediate relative to the first and second components, such that force may be transferred between the first and second components. Direct or indirect coupling may be accomplished through any type of fastener, adhesive, connector, joining, or attachment technique.

In some implementations, the user device 102 may include a skirt, gasket, bezel, or other structure situated in at least a portion of the gap 112 between the inner device 104 and the outer shell 110. Such a structure may prevent dust or other debris from entering the gap 112 and obstructing the movement of the inner device 104. For clarity of illustration, FIG. 1 and the other figures herein may present the gap 112 as wider than the gap employed in some implementations. Accordingly, the dimensions of the various elements shown in the figures, or the relative dimensions of the various elements, are not to be construed as limiting of implementations.

Implementations may employ any type of haptic actuator for the haptic actuator(s) 114, including but not limited to electroactive polymer actuators, piezoelectric actuators, inertial or linearly-reciprocating mass actuators, eccentric rotating mass actuators, electrostatic repulsion actuators, and so forth. Various types of the haptic actuators 114 are further described with reference to FIGS. 4-6. In some implementations, the haptic actuator(s) 114 may include multiple actuators of a same type. Alternatively, implementations may employ multiple haptic actuators of different types, arranged in various locations in the user device 102.

As described herein, the haptic actuator(s) 114 may generate movement of the inner device 104 relative to the outer shell 110. In some cases, the relative movement of the inner device 104 may be in a substantially transverse direction in a plane defined by the two longest dimensions or two longest axes of the inner device 104. Alternatively, the relative movement of the inner device 104 may be in a substantially perpendicular direction that is perpendicular to a plane defined by the two longest dimensions of the inner device 104. Implementations also support relative movement of the inner device 104 in a direction that is any combination of a transverse movement and a perpendicular movement.

Implementations may employ any number of the haptic actuator(s) 114 in various arrangements to present haptic effects through a relative motion of the inner device 104 and the outer shell 110. FIG. 1 depicts an implementation in which two haptic actuators 114 are situated on opposite sides of the inner device 104, coupled to surfaces on the edges of the inner device 104. Implementations may employ any number of haptic actuator(s) 114 coupled to edges of the inner device 104, or other sides of the inner device 104. Further, implementations may also employ any number of haptic actuator(s) 114 coupled to a surface of the inner device 104 that is on an opposite side of the inner device 104 from the display 106. FIGS. 7-10 illustrate various example arrangements of the haptic actuator(s) 114 in the user device 102, according to implementations.

In some implementations, the outer shell 110 may substantially enclose one or more sides of the inner device 104 except for at least a portion of the side that includes the display 106. Accordingly a user of the user device 102 may view information presented on the display 106. Moreover, in some cases the display 106 is coupled to one or more touch input devices, configuring the display 106 as a touch-sensitive display for receiving user input. Because the outer shell 110 may leave the touch-sensitive display 106 substantially accessible, a user may enter information or commands to the inner device 104 by touching or performing gestures on the touch-sensitive display 106.

Although the examples here describe the inner device 104 as including the display 106, implementations are not so limited. In some implementations, the inner device 104 may include one or more touch input devices without a display. In such cases, inputs may be entered through a touch-sensitive pad, surface, or other touch input devices included in the inner device 104.

Inputs entered by a user, through the display 106 or otherwise, may generate one or more input events. The input event(s) may also be generated based on other types of inputs or events in the inner device 104, such as communications from processes executing on other devices or events generated by processes or applications executing on the inner device 104.

In some implementations, input event data 116 describing the input event(s) may be received by one or more applications 118 executing in the memory of the inner device 104. The application(s) 118 may include user applications such as media players, game applications, electronic book readers, word processing applications, social media applications, messaging or communication applications, or any other type of user applications. The application(s) 118 may also include modules or applications of an operating system (OS) executing in the memory of the inner device 104. The application(s) 118 may also include other types of applications, such as processes or software modules that perform internal operations for the inner device 104. Accordingly, the application(s) 118 may provide a user interface enabling user interactions, or may not include a user interface.

On receiving the input event data 116, the application(s) 118 may analyze the input event data 116 and determine that one or more haptic effects 120 are to be presented based on the input event data 116. Such haptic effects 120 may provide for a richer or more visceral user experience. For example, an application 118 that accepts user input through a touch-sensitive display 106, such as a word processing application, game, chat client, and so forth, may determine to present a vibro-tactile haptic effect 120 as feedback for the touch input. As another example, an application 118 that is a media player presenting a video may determine to present one or more haptic effects 120 to accentuate or enhance events (e.g., explosions, collisions, and so forth) presented in the video content.

The application(s) 118 may instruct one or more haptic controllers 122 to generate one or more control signals 124. The haptic controller(s) 122 may send the control signal(s) 124 to the haptic actuator(s) 114, to signal the haptic actuator(s) 114 to present the haptic effect(s) 120. In some implementations, one control signal 124 may be sent to multiple haptic actuators 114. Alternatively, a plurality of different control signals 124 may be sent to different haptic actuators 114. In some implementations, the inner shell 108 may include one or more vias to enable the control signal(s) 124 to be sent out from the inner device 104 to the haptic actuator(s) 114.

Figure 2:
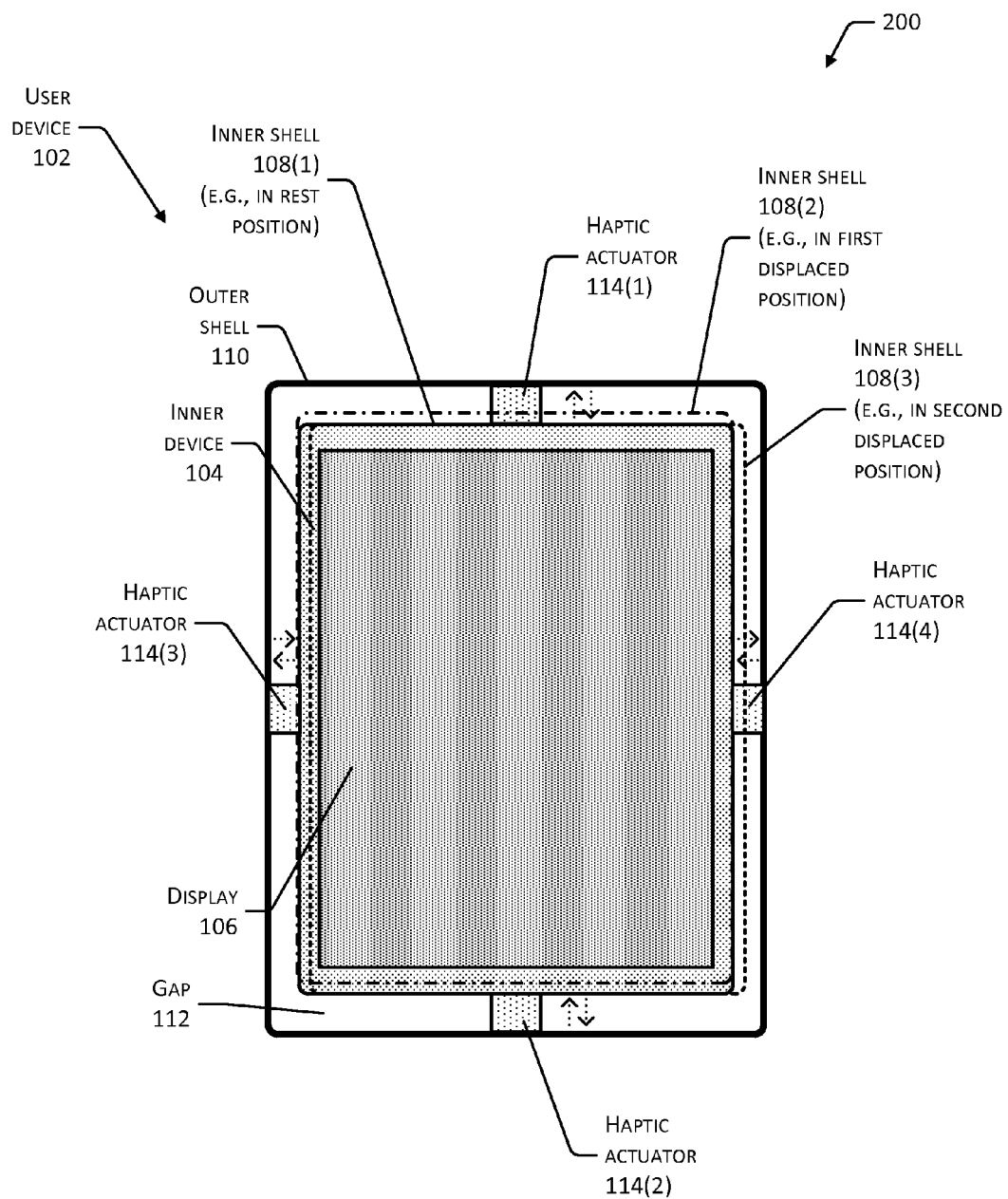
FIG. 2 depicts a planar view of a user device configured to present haptic effects through relative motion of an inner device and an outer shell, including one or more haptic actuators to generate the relative motion.

FIG. 2 depicts a schematic 200 showing a planar view of the user device 102 configured to present the haptic effects 120 by generating relative motions of the inner device 104 and the outer shell 110. The schematic 200 shows an example implementation in which at least four haptic actuators 114 operate to generate the relative motion. In the example shown in schematic 200, the haptic actuators 114 respond to one or more control signals 124 by displacing the inner device 104 relative to the outer shell 110. Such displacement(s) may be in a substantially transverse direction, e.g., in an X-Y plane that is substantially parallel to a plane formed by at least a portion of the display 106.

Accordingly, the schematic 200 depicts the inner shell 108, which surrounds the inner device 104, in various positions following various displacements by the haptic actuators 114. For example, the inner shell 108(1) is in a rest position prior to any displacement. The inner shell 108(2) is in a first displaced position that is displaced from the rest position. The inner shell 108(3) is in a second displaced position that is displaced from both the rest position and the first displaced position. The inner shell 108(2) and the inner shell 108(3) may be displaced in a direction in the X-Y plane that is parallel to at least a portion of the display 106.

Implementations support motions of the inner device 104 relative to the outer shell 110, in any direction or combination of directions and with any amplitude within the clearance of the gap 112. For example, the haptic actuators 114(1) and 114(2) may perform actions to generate a relative motion of the inner device 104 along a Y direction, as shown in FIG. 2. Further, the haptic actuators 114(3) and 114(4) may perform actions to generate a relative motion of the inner device 104 along an X direction, as shown in FIG. 2. As another example, one or more of the haptic actuators 114 may perform actions to generate a relative motion of the inner device 104 that is substantially elliptical or circular within the X-Y plane.

In some cases, the haptic actuators 114 may each perform actions to generate a relative motion of the inner device 104 along the X direction. In such cases, each of the haptic actuators 114 may generate a motion in the X direction. For example, the haptic actuators 114(1) and 114(2) may generate a transverse motion that is substantially parallel to the surface to which they are coupled, and the haptic actuators 114(3) and 114(4) may generate a perpendicular motion that is substantially perpendicular to the surface to which they are coupled. Alternatively, the haptic actuators 114 may perform actions to generate a relative motion of the inner device 104 along the Y direction. For example, the haptic actuators 114(1) and 114 (2) may generate a perpendicular motion that is substantially perpendicular to the surface to which they are coupled, and the haptic actuators 114(3) and 114(4) may generate a transverse motion that is substantially parallel to the surface to which they are coupled.

Moreover, in some implementations the displacements may be substantially in a perpendicular direction, such as in a Z direction substantially perpendicular to a plane formed by at least a portion of the display 106. However such motions may lead to the generation of sound through compression and decompression of air in the gap 112. Accordingly, implementations may provide for relative motions on the inner device 104 in an X-Y plane, with minimal or no relative motions of the inner device 104 in a Z direction.

Figure 3:
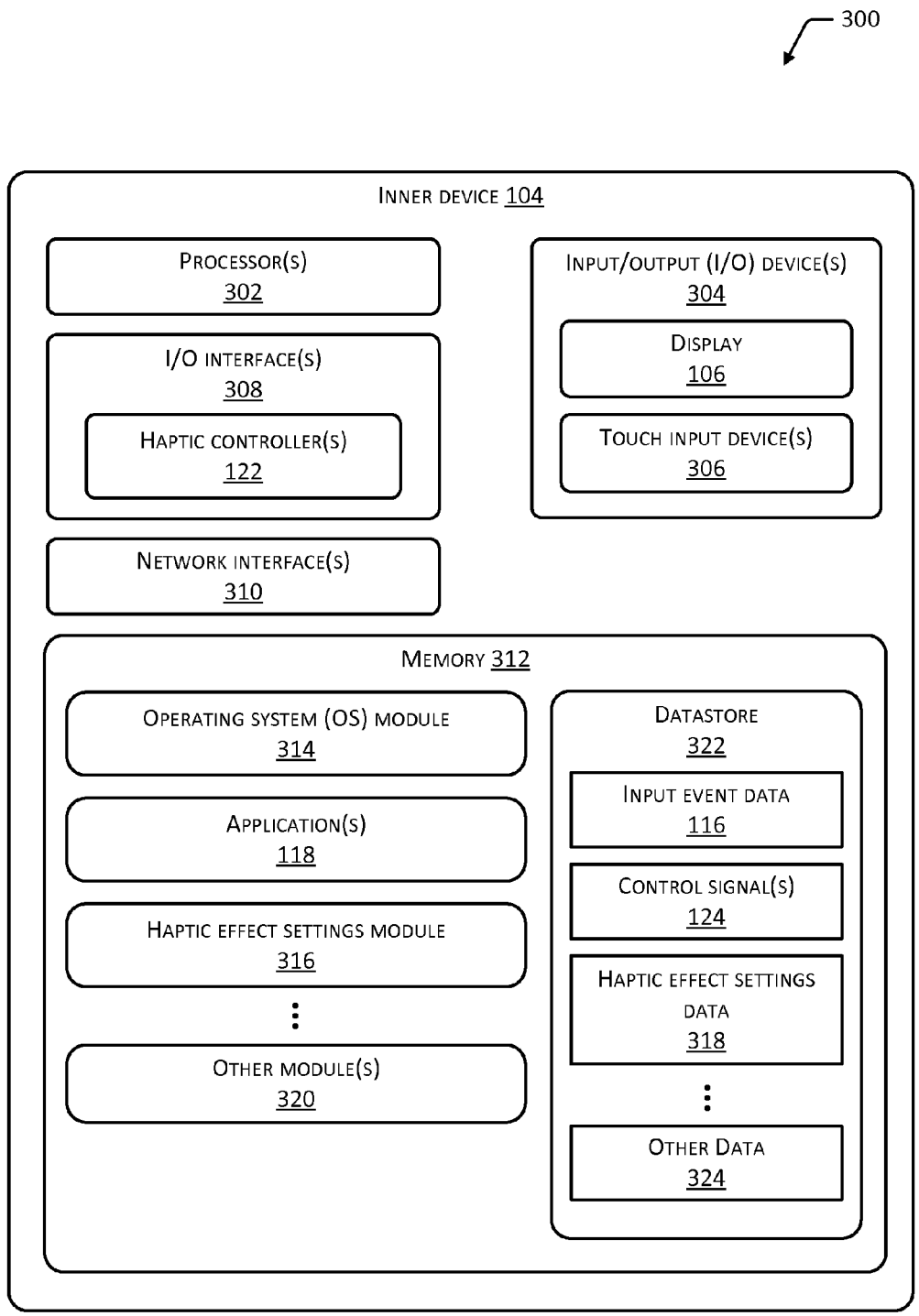
FIG. 3 depicts a block diagram of a user device configured to perform operations for presenting haptic effects through one or more haptic actuators.

FIG. 3 depicts a block diagram 300 of the inner device 104 configured to perform operations for presenting the haptic effects 120 through one or more haptic actuators 114. As shown in block diagram 300, the inner device 104 may include one or more processors 302 configured to execute one or more stored instructions. The processor(s) 302 may comprise one or more cores.

The inner device 104 may include one or more input/output (I/O) devices 304. The I/O device(s) 304 may include user input devices such as a keyboard, a mouse, a pen, a game controller, a voice input device, a gestural input device, a haptic input device, or other devices. The I/O device(s) 304 may also include the display 106, and one or more touch input devices 306. In some cases, the touch input device(s) 306 may be coupled to the display 106 to provide a touch-sensitive display 106. The I/O device(s) 304 may be physically incorporated with the inner device 104, or may be externally placed.

For example, the inner device 104 may communicate with the haptic actuator(s) 114, which may be externally placed relative to the inner device 104 and arranged to couple the inner device 104 to the outer shell 110 as described herein. In some implementations, one or more electrical connections such as electrical leads, couplings, or wires may be arranged outside the inner device 104 (e.g., on an outer surface of the inner shell 108) to connect one or more components of the inner device 104 to the haptic actuator(s) 114. In such cases, the inner shell 108 may include one or more vias or ports to allow such connections to the haptic actuator(s) 114, enabling the control signal(s) 124 to be sent to the haptic actuator(s) 114.

The inner device 104 may include one or more I/O interfaces 308 to enable components of the inner device 104 to control, interface with, or otherwise communicate with the I/O device(s) 304. The I/O interface(s) 308 may enable information to be transferred in or out of the inner device 104, or between components of the inner device 104, through serial communication, parallel communication, or other types of communication. For example, the I/O interface(s) 308 may comply with the RS-232 standard for serial ports, or with the Institute of Electrical and Electronics Engineers (IEEE) 1284 standard for parallel ports. As another example, the I/O interface(s) 308 may be configured to provide a Universal Serial Bus (USB) connection.

In some implementations, the I/O interface(s) 308 include the one or more haptic controllers 122, configured to send one or more control signals 124 to signal the haptic actuator(s) 114 to present the haptic effect(s) 120. In some cases, the haptic controller(s) 122 may be incorporated into the processor(s) 302. Alternatively, the processor(s) 302 may perform one or more operations to send the control signal(s) 124 to signal the haptic actuator(s) 114 to present the haptic effect(s) 120.

The inner device 104 may also include one or more busses or other communications hardware or software components, which allow for the transfer of data between the various modules and components of the inner device 104.

The inner device 104 may include one or more network interfaces 310 to enable communications between the inner device 104 and other networked devices. The network interface(s) 310 may include one or more network interface controllers (NICs) or other types of transceiver devices configured to send and receive communications over a network. In some implementations, the outer shell 110 may substantially enclose the inner device 104, while leaving access to one or more of the display 106, the I/O interface(s) 308, or the network interface(s) 310. Thus, implementations may enable communications between the inner device 104 and one or more external devices, and may enable the presentation of information to a user through the display 106.

The inner device 104 may include one or more memories, described herein as memory 312. The memory 312 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 312 provides storage of computer-readable instructions, data structures, program modules, and other data for the operation of the inner device 104.

The memory 312 may include an OS module 314. The OS module 314 may be configured to manage hardware resources such as the I/O device(s) 304, the I/O interface(s) 308, and the network interface(s) 310, and to provide various services to applications, processes, or modules executing on the processor(s) 302. The OS module 314 may include one or more of the following: any version of the Linux® operating system originally released by Linus Torvalds; any version of iOS® from Apple Corp. of Cupertino, Calif.; any version of Windows® or Windows Mobile® from Microsoft Corp. of Redmond, Wash.; any version of Android® from Google, Corp. of Mountain View, Calif. and its derivatives from various sources; any version of Palm OS® from Palm Computing, Inc. of Sunnyvale, Calif. and its derivatives from various sources; any version of BlackBerry OS® from Research In Motion Ltd. of Waterloo, Ontario, Canada; any version of VxWorks® from Wind River Systems of Alameda, Calif.; or other operating systems.

The memory 312 may include the one or more applications 118. In some cases, the application(s) 118 may be configured to receive the input event data 116, and determine that one or more haptic effects 120 are to be presented based on the input event data 116.

In some implementations, the memory 312 may include a haptic effect settings module 316, which may enable a user to set preferences for when the haptic effect(s) 120 are to be presented based on the input event data 116. The haptic effect settings module 316 may also enable to a user to specify that haptic effects are to be enabled or disabled, in whole or in part, on the user device 102. In some implementations, the haptic effect settings module 316 may enable a user to select, from a plurality of available haptic effects, a particular haptic effect 120 to be presented under particular circumstances or when using a particular application 118. In some cases, the haptic effect settings module 316 may generate haptic effect settings data 318, describing the preferences of one or more users of the user device 102 as expressed through the haptic effect settings module 316.

Although the haptic effect settings module 316 is shown in FIG. 3 as a separate module, in some implementations the haptic effect settings module 316 may be incorporated with other modules such as the application(s) 118, the OS module 314, and so forth. The presentation of the haptic effect(s) 120 based on the haptic effect settings data 318 is described further with reference to FIG. 11.

In some implementations, the outer shell 110 is removable, and the haptic actuator(s) 114 may be included as components of the outer shell 110. A user of the user device 102 may attach the outer shell 110 to enable the presentation of the haptic effect(s) 120, and may decouple or remove the outer shell 110 to disable the presentation of the haptic effect(s) 120. The removable outer shell 110, including the haptic actuator(s) 114, may be configured as a removable case or a removable cover for the inner device 104. A component of the inner device 104 may detect the presence of the removable outer shell 110, and the haptic controller(s) 122 may signal the haptic actuator(s) 114 to present haptic effects when the removable outer shell 110 is present. The control signal(s) 124 may be disabled when the removable outer shell 110 is decoupled or otherwise not present. Such implementations are described further with reference to FIG. 12.

The memory 312 may also include one or more other modules 320, such as a user authentication module, an access control module, and so forth.

The memory 312 may also include a datastore 322 to store information for operations of the inner device 104. The datastore 322 may comprise a database, array, structured list, tree, or other data structure. The datastore 322 may store the input event data 116, and the haptic effect settings data 318.

In some implementations, the datastore 322 may store the control signal(s) 124. Such control signal(s) 124 may include digital, analog, or both digital and analog signals which, when received by the haptic actuator(s) 114, signal the haptic actuator(s) 114 to present the haptic effect(s) 120. In some cases, the control signal(s) 124 may be stored on the haptic controller(s) 122.

The datastore 322 may also store other data 324, such as user account information, user authentication information, and so forth. In some implementations, at least a portion of the information stored in the datastore 322 may be stored externally to the inner device 104, on other devices that are accessible to the inner device 104 via the I/O interface(s) 308 or the network interface(s) 310.

Figure 4:
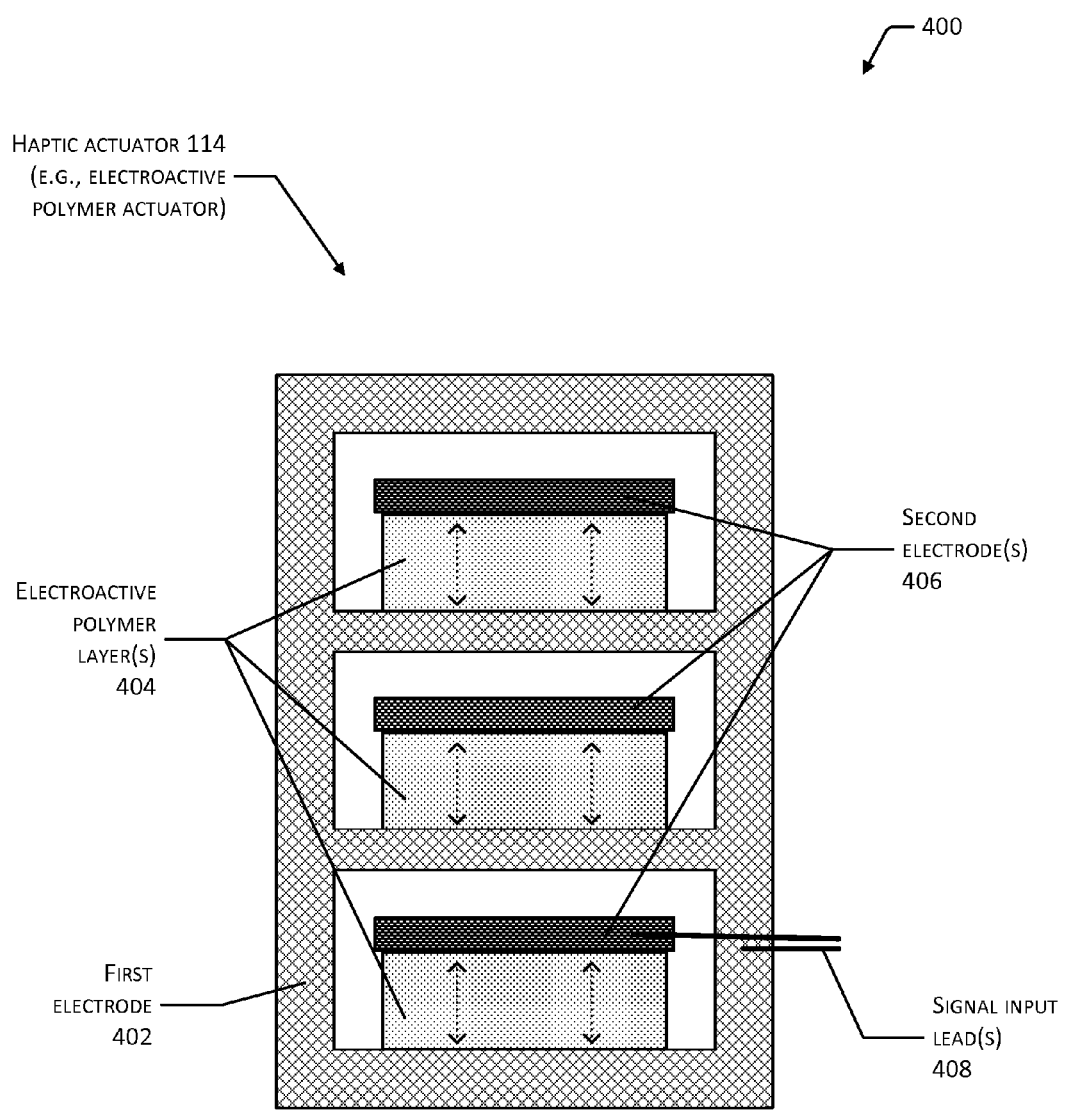
FIG. 4 depicts a schematic for an electroactive polymer type of haptic actuator that may be included in the user device.

FIG. 4 depicts a schematic 400 for an electroactive polymer type of the haptic actuator(s) 114 that may be included in the user device 102. In this example, the haptic actuator 114 employs an electroactive polymer arrangement such as that manufactured by Artificial Muscle, Inc.®, of Sunnyvale Calif.

In the example shown, the haptic actuator 114 includes a first electrode 402, coupled to one or more electroactive polymer layer(s) 404. Each of the electroactive polymer layer(s) 404 is coupled to a second electrode 406, such that the electroactive polymer layer 404 is situated between the first electrode 402 and a corresponding second electrode 406. The haptic actuator 114 may also include two or more signal input leads 408. A first one of the signal input leads 408 may connect to the first electrode 402, and one or more second signal input leads 408 may connect to each of the second electrode(s) 406 to generate a voltage difference between the first electrode 402 and the second electrode(s) 406.

Although the example shown in FIG. 4 includes three electroactive polymer layers 404 and three second electrodes 406, implementations may employ haptic actuator(s) 114 that include any number of electroactive polymer layers 404 and any number of second electrodes 406. Further, although the example of FIG. 4 shows the three electroactive polymer layers 404 arranged serially along a Y axis, implementations support other configurations for the haptic actuator 114.

In some implementations, the electroactive polymer layer(s) 404 may be composed of an electroactive polymer material, such as a dielectric polymer material. When a voltage difference is applied between the first electrode 402 and the second electrode(s) 406, the first electrode 402 and the second electrode(s) 406 may be attracted to or repelled from each other, causing each of the electroactive polymer layer(s) 404 to change shape (e.g., expand and contract). Accordingly an alternating voltage signal, such as the control signal(s) 124 applied to create a voltage difference between the first electrode 402 and the second electrode(s) 406 through signal input lead(s) 408, may cause the electroactive polymer layer(s) 404 to expand and contract alternatingly. In the example shown in FIG. 4, the electroactive polymer layer(s) 404 may expand and contract along one or more of the X, Y, and Z axes.

In some implementations, the first electrode 402 may be coupled to an outer surface of the inner shell 108, and the second electrode(s) 406 may be coupled to an inner surface of the outer shell 110. Alternatively, the first electrode 402 may be coupled to an inner surface of the outer shell 110, and the second electrode(s) 406 may be coupled to an outer surface of the inner shell 108. In either case, the change in the shape of the electroactive polymer layer(s) 404 in response to the control signal(s) 124 may generate one or more relative movements of the outer shell 110 and the inner device 104, and such movements may generate the haptic effect(s) 120.

For example, the second electrode(s) 406 may move along the Y axis relative to the first electrode 402. The planar surface of the first electrode 402, formed by the X-Y plane as shown in FIG. 4, may be coupled to an inner surface of the outer shell 110, such that the outer shell 110 has a higher Z value than the haptic actuator 114. Each of the second electrode(s) 406 may be coupled to an outer surface of the inner shell 108, such that the inner shell 108 has a lower Z-value than the haptic actuator 114. The movement of the second electrode(s) 406 relative to the first electrode 402 along the Y axis may cause a transverse displacement (e.g., a shearing movement) of the inner device 104 relative to the outer shell 110 along the Y axis.

Figure 5:
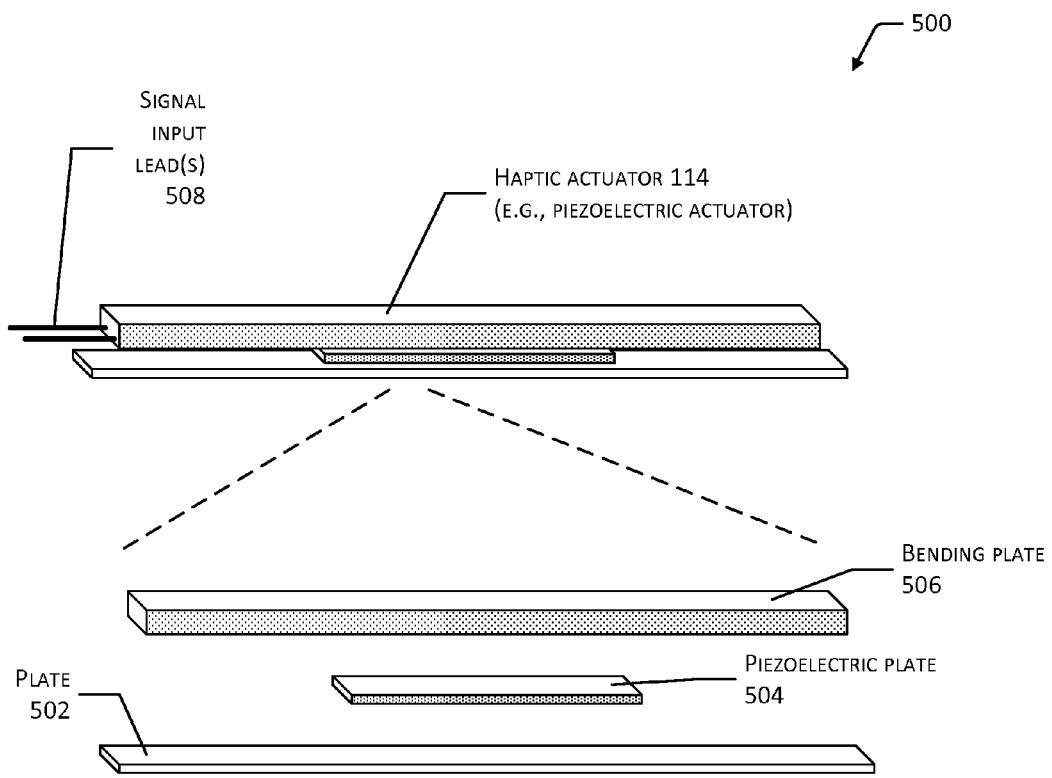
FIG. 5 depicts a schematic for a piezoelectric type of haptic actuator that may be included in the user device.
Figure 5:
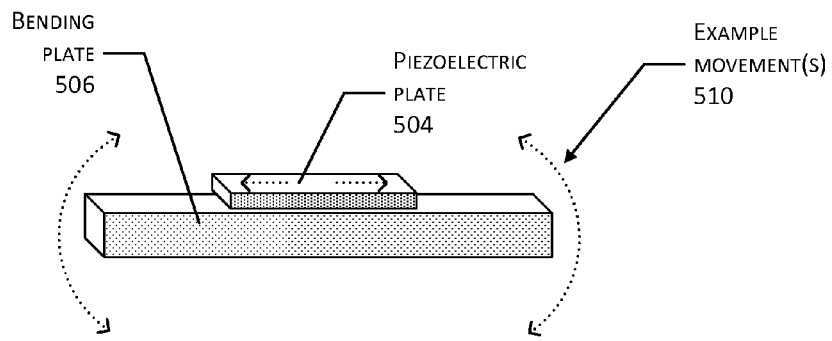
Figure 5:
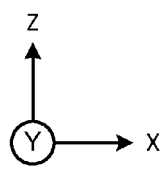

FIG. 5 depicts a schematic 500, showing an expanded view of a piezoelectric type of the haptic actuator 114 that may be included in the user device 102. In the example shown, the haptic actuator 114 includes a plate 502 and a piezoelectric plate 504. The piezoelectric plate 504 may be coupled to at least a portion of the plate 502, and the piezoelectric plate 504 may be coupled to a bending plate 506. The plate 502 and the bending plate 506 may be respectively coupled to the inner shell 108 and the outer shell 110 to couple the inner device 104 to the outer shell 110. Alternatively, the plate 502 and the bending plate 506 may be respectively coupled to the outer shell 110 and the inner shell 108.

The piezoelectric plate 504 may be composed of a ceramic piezoelectric material such as barium titanate, lead zirconate titanate, lead titanate, lithium niobate, lithium tantalite, bismuth ferrite, bismuth titanate, or other ceramic materials that display piezoelectric properties. The piezoelectric plate 504 may also be composed of a non-ceramic piezoelectric material including but not limited to a polymer such as polyvinylidene fluoride.

In a piezoelectric material, the internal crystal structure (in the case of a ceramic) or the internal polymer structure (in the case of a polymer) alters its spacing or is otherwise deformed in response to an applied electrical field. Accordingly, the piezoelectric plate 504 may change its shape or size in response to an applied electrical field, such as that caused by applying the control signal(s) 124 to the piezoelectric plate 504. In some implementations, the haptic actuator 114 may include one or more signal input leads 508 that carry the control signal(s) 124 to the haptic actuator 114, and enable the control signal(s) 124 to be applied to the piezoelectric plate 504 to generate movements of the bending plate 506.

Because the piezoelectric plate 504 is coupled to the bending plate 506, a periodic change in the shape of the piezoelectric plate 504 may create a periodic deformation of the bending plate 506 back and forth along one or more axes of motion. Such deformations are illustrated as example movement(s) 510 in FIG. 5. In the example shown, the bending plate 506 bends in at least one direction as the piezoelectric plate 504 expands or contracts. Because the plate 502 and the bending plate 506 may be coupled to the outer shell 110 and the inner shell 108, the movement(s) of the bending plate 506 may generate a motion of the inner device 104 relative to the outer shell 110, to present the haptic effect(s) 120 described herein.

A piezoelectric type of the haptic actuator 114 may include any number of piezoelectric plates 504, or other structures composed of a piezoelectric material, to generate vibrations or other motions for haptic effects. In cases where multiple piezoelectric plates 504 are employed, the piezoelectric plates 504 may perform different, but complimentary, deformations to cause the movement of the bending plate 506.

Figure 6:
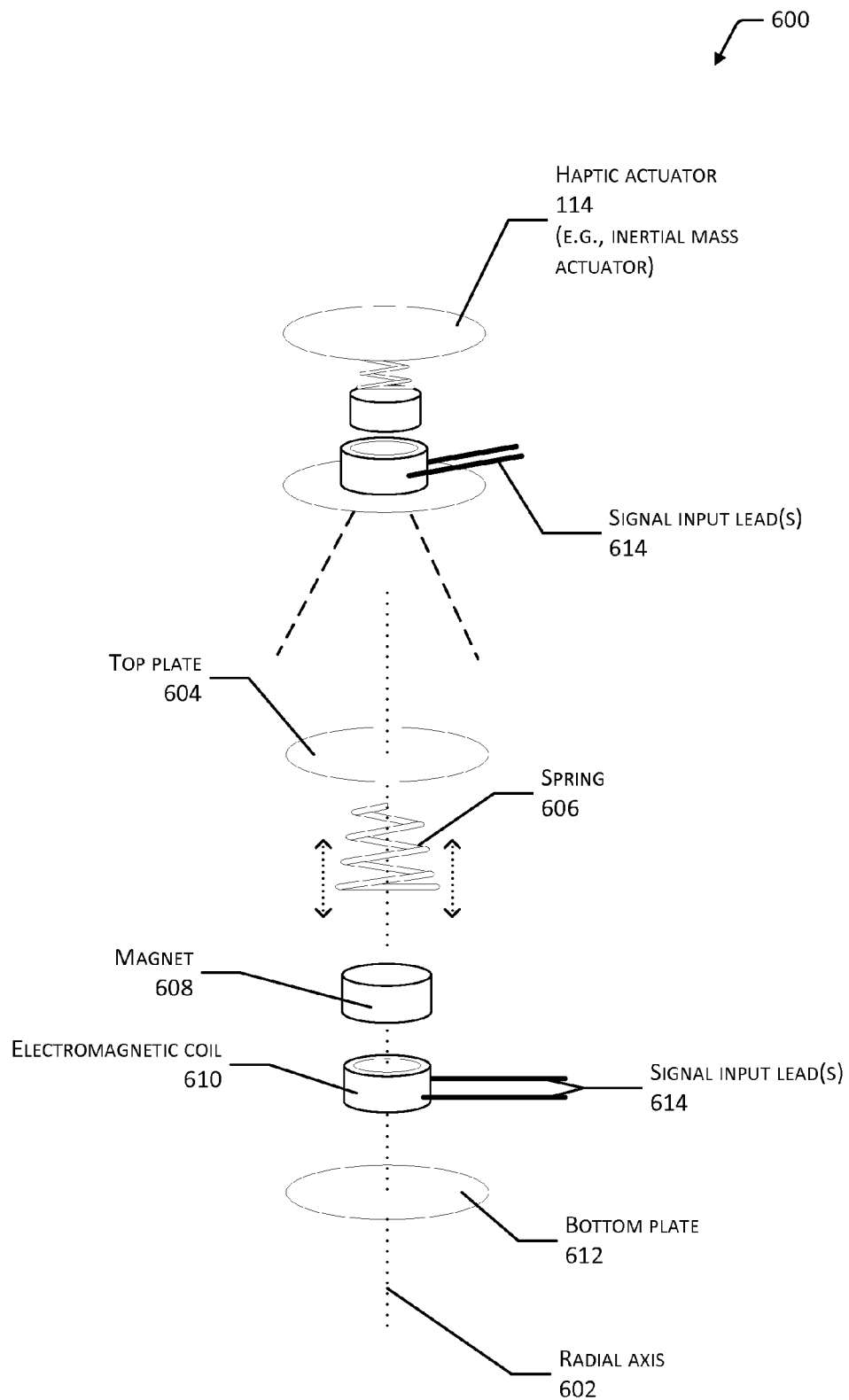
FIG. 6 depicts a schematic for a linearly-reciprocating mass or inertial mass type of haptic actuator that may be included in the user device.

FIG. 6 depicts a schematic 600 for a linearly-reciprocating mass or inertial mass type of the haptic actuator(s) 114 that may be included in the user device 102. The schematic 600 shows various components of the haptic actuator 114 expanded along a radial axis 602 for illustrative purposes.

In the example shown, the haptic actuator 114 includes a top plate 604 that may be coupled to a spring 606. The spring 606 may be coupled to a magnet 608. The haptic actuator 114 may also include an electromagnetic coil 610 coupled to a bottom plate 612. The haptic actuator 114 may also include one or more signal input lead(s) 614 which carry the control signal(s) 124 into the haptic actuator 114, to the electromagnetic coil 610. On receiving the control signal(s) 124, the electromagnetic coil 610 may modulate a magnetic field to cause the magnet 608 to move along the radial axis 602. The modulating magnetic field may also cause the top plate 604 to move relative to the bottom plate 612.

In some implementations, the top plate 604 may be coupled to an outer surface of the inner shell 108 and the bottom plate 612 may be coupled to an inner surface of the outer shell 110. Alternatively, the bottom plate 612 may be coupled to an outer surface of the inner shell 108 and the top plate 604 may be coupled to an inner surface of the outer shell 110. Because the top plate 604 and the bottom plate 612 are coupled to the inner shell 108 and the outer shell 110, the relative motion of the top plate 604 and the bottom plate 612 may cause movement of the inner device 104 relative to the outer shell 110. Such a movement may be perceivable to a user as the haptic effect(s) 120.

Implementations may employ any number and type of the haptic actuator(s) 114. In some cases, the number of the haptic actuators 114 employed in the user device 102 may be based, at least in part, on the mass of the inner device 104 that the haptic actuators 114 are to move.

In some cases, coupling the haptic actuator 114 to the inner device 104, such that the inner device 104 operates as the unsprung mass of the haptic actuator 114, may alter the resonant frequency of the haptic actuator 114. As used herein, a resonant frequency for the haptic actuator(s) 114 refers to a frequency or range of frequencies for which the ratio of the power output to the input signal strength is at a maximum. In some cases, coupling a haptic actuator 114 to the inner device 104 may shift the resonant frequency of the haptic actuator 114 from a first frequency (e.g., 195 Hz) to a second, lower frequency (e.g., between 50 and 80 Hz). This shift in the resonant frequency may enable the haptic actuator(s) 114 to be driven at a lower frequency, thus consuming less power and enabling a longer battery life or a more efficient power consumption profile for the user device 102.

In some implementations, as shown in the examples of FIGS. 4-6, the haptic actuator(s) 114 may not include any additional mass or ballast in their moving components. In such cases, the inner device 104 may be considered the unsprung mass of the haptic actuator 114, and the outer shell 110 may be considered the sprung mass of the haptic actuator 114 given that the outer shell 110 may be held substantially stationary by the user. Alternatively, the haptic actuator(s) 114 may include additional mass or ballast. In either case, the movements of the inner device 104 relative to the outer shell 110 may generate the haptic effect(s) 120. As used herein, a sprung mass refers to one or more objects that are substantially stationary, while coupled to an unsprung mass that is configured to move relative to the sprung mass.

Although the examples of FIGS. 4-6 depict haptic actuators 114 in which the control signal(s) 124 generate a movement along a particular axis or direction, implementations are not so limited. Some implementations may employ haptic actuator(s) 114 in which a control signal 124 generates a movement in other directions. For example, the haptic actuator(s) 114 may provide for motions in a transverse direction that is substantially perpendicular to a radial axis. Accordingly, objects coupled to the top and bottom plates of the haptic actuators 114 shown in FIGS. 4-6 may move laterally with respect to one another, instead of or in addition to moving radially to and from one another.

Moreover, in some implementations the haptic actuator(s) 114 may have a different configuration than those shown in the examples of FIGS. 4-6. For example, implementations may employ haptic actuators 114 with a rectangular form factor, with a circular or elliptical form factor, or with an irregularly shaped form factor. Moreover, the haptic actuator(s) 114 may be more or less planar, or more or less flat, than those depicted in FIGS. 4-6. The relative sizes, arrangements, and positions of the elements shown in FIGS. 4-6 are not to be construed as limiting of implementations. In some implementations, the haptic actuator(s) 114 may be substantially planar haptic actuator(s). Such planar haptic actuator(s) may have a thickness not exceeding 500 micrometers.

FIGS. 7-10 depict side views of various configurations of the user device 102, along the "A" or "B" cross sections shown in FIG. 1. The examples shown in these figures are not limiting of implementations.

Figure 7:
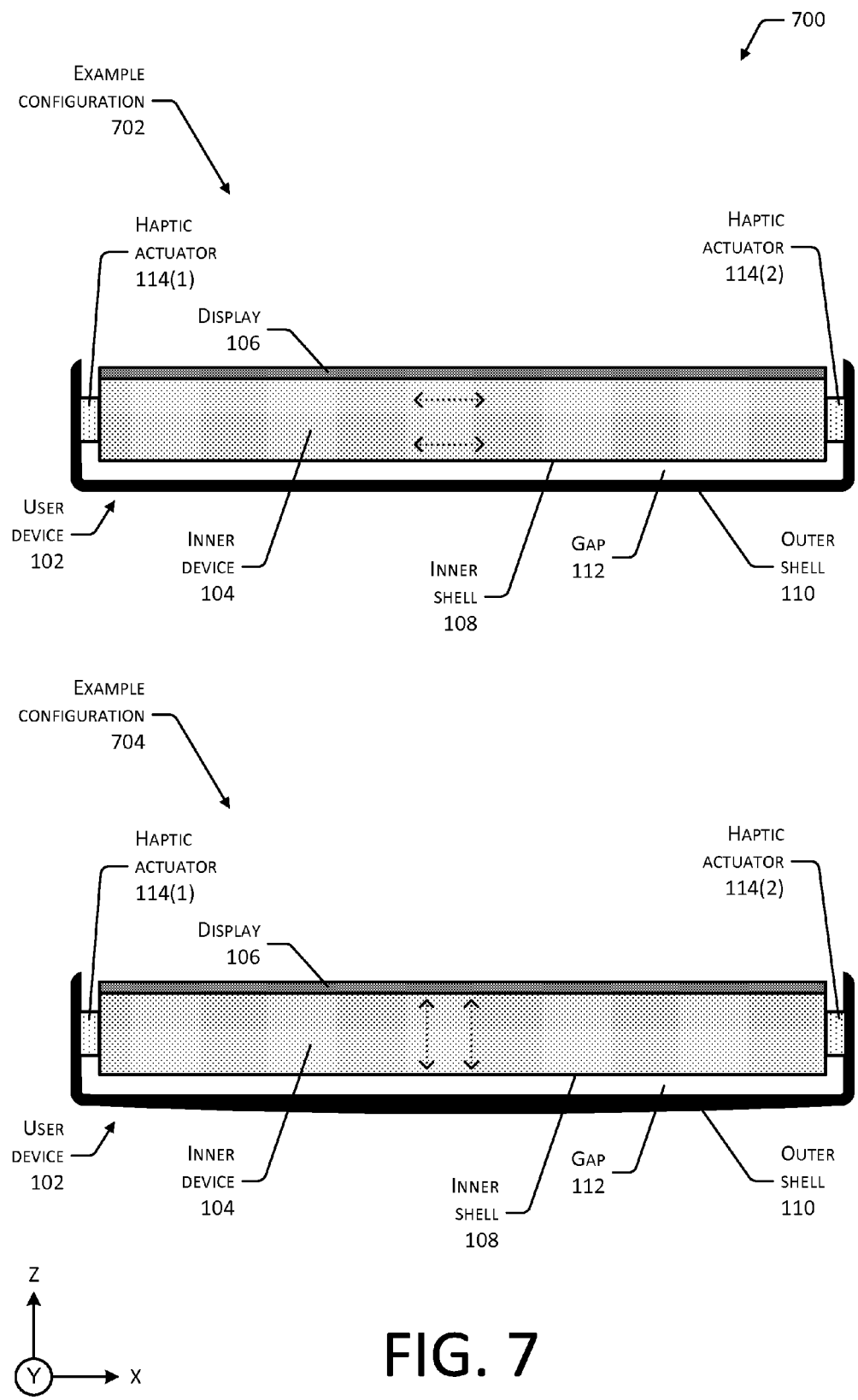
FIG. 7 depicts side views of the user device configured to present haptic effects through relative motion of an inner device and an outer shell, including at least two haptic actuators coupled to opposite sides of the inner device.

FIG. 7 depicts a schematic 700 showing two example configurations of the user device 102, including at least two haptic actuators 114 coupled to opposite sides of the inner device 104. In example configurations 702 and 704, each of the haptic actuators 114 are coupled to at least a portion of an inner surface of the outer shell 110, and at least a portion of the outer surface of the inner shell 108. The displacements provided by the haptic actuators 114 may cause one or more displacements or motions of the inner device 104 relative to the outer shell 110, and the relative displacement(s) or motion(s) may provide the haptic effect(s) 120 that are perceivable by a user of the user device 102.

In the example configuration 702, each of the haptic actuators 114 is arranged to provide a displacement that is substantially perpendicular to the surfaces to which it is coupled. Because the haptic actuators 114 are arranged to provide a substantially perpendicular displacement, the relative displacement(s) or motion(s) of the inner device 104 may be in a transverse direction that is substantially parallel to a plane formed by at least a portion of the display 106, e.g., in a direction within the X-Y plane as shown in FIG. 7.

In example configuration 704, each of the haptic actuators 114 is arranged to provide a displacement that is substantially parallel to the surfaces to which it is coupled. Because the haptic actuators 114 are arranged to provide a substantially parallel displacement, the relative displacement(s) or motion(s) of the inner device 104 may be in a perpendicular direction that is substantially perpendicular to the X-Y plane formed by at least a portion of the display 106, e.g., in a Z direction as shown in FIG. 7.

As used herein, the term perpendicular may refer to a direction that is at a 90 degree angle to a plane or to another direction. Perpendicular may also refer to a direction that is within a margin of the 90 degree angle. For example, a direction that is referred to as perpendicular to a plane may form an angle with the plane that is between 85 and 95 degrees. As another example, a direction that is referred to as perpendicular to a plane may form an angle with the plane that is between 80 and 100 degrees. As used herein, the term parallel may refer to a direction that is at a 0 degree angle to a plane or to another direction. Parallel may also refer to a direction that is within a margin of the 0 degree angle. For example, a direction that is referred to as parallel to a plane may form an angle with the plane that is up to 5 degrees, up to 10 degrees, and so forth.

In some implementations, as illustrated in the examples of FIG. 7, the outer shell 110 may extend past the plane of the outer surface of the display 106. Such an arrangement may enable a user of the user device 102 to perceive the display 106 as being set into the outer shell 110 at a particular depth. Such an arrangement may also enable a user to perceive the user device 102 as a unitary device even though the outer shell 110 may be at least partly separated from the inner device 104 by the gap 112, and coupled to the inner device 104 by the haptic actuator(s) 114.

In some implementations, the width of the gap 112 may be at least as wide as to enable clearance for the movements of the inner device 104. For example, where the inner device 104 is moving in a transverse direction as in the example configuration 702, the gap 112 on the edges of the inner device 104 may have a width or dimension that is at least the range of motion of the inner device 104, or the width of the haptic actuator(s) 114. In such cases, the gap 112 between the back surface of the inner device 104 (e.g., opposite to the display 106) may be zero or negligible, given that there may be little or no perpendicular motion of the inner device 104. Alternatively, where the inner device 104 is moving in a perpendicular direction as in the example configuration 704, the gap 112 on the edges of the inner device 104 may be the width of the haptic actuator(s) 114, given that there may be little or no transverse motion of the inner device 104 in such a configuration. In such cases, the gap 112 on the back surface of the inner device 104 may be wide enough to provide clearance for the perpendicular movement of the inner device 104. Accordingly, the size of the gap 112 may differ on different sides of the inner device 104.

Although the examples of FIG. 7 show a pair of two haptic actuators 114 situated on opposite sides of the inner device 104, implementations may include any number of pairs of haptic actuators 114. In such cases, the two actuators in each pair of the haptic actuators 114 may be coupled to the outer shell 110 on opposite sides of the inner device 104. Moreover, example configuration 704 depicts a side view of an example user device 102 in which the side oppose to the display 106 is curvilinear. Implementations support user device(s) 102 that include sides, walls, or plates of any shape.

Figure 8:
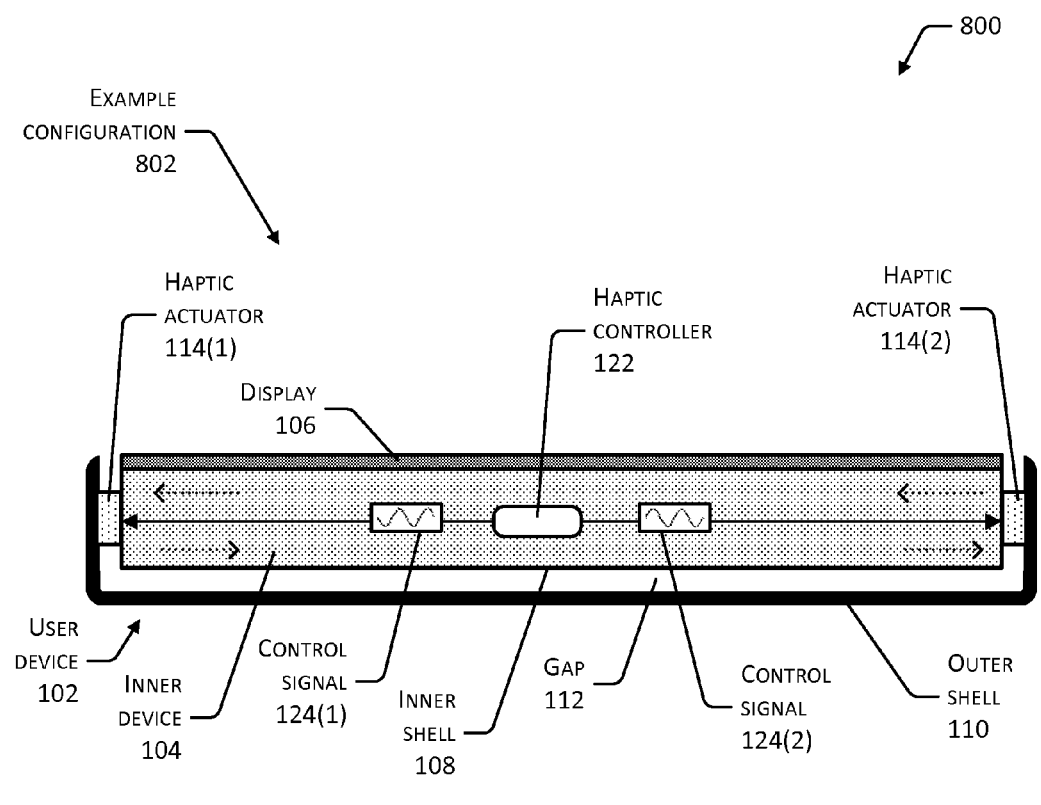
FIG. 8 depicts side views of the user device configured to present haptic effects through relative motion of an inner device and an outer shell, including at least two haptic actuators that are coupled to opposite sides of the inner device and that receive different control signals or a same control signal.
Figure 8:
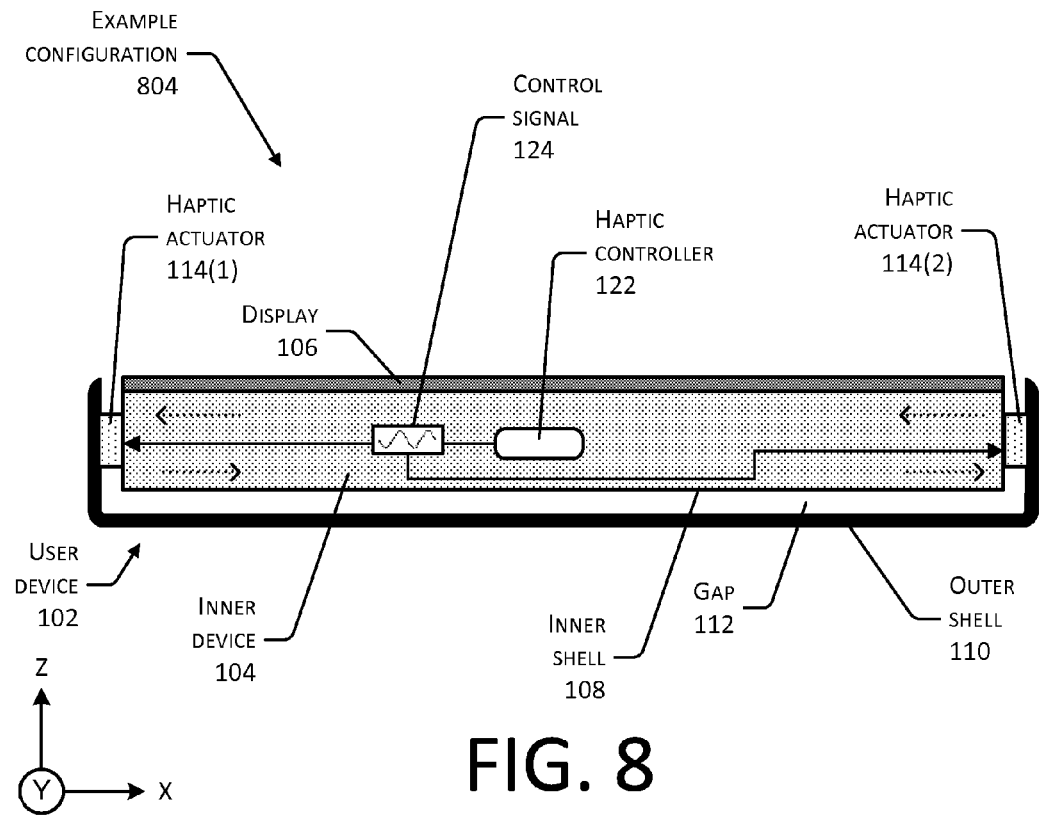

FIG. 8 depicts a schematic 800 showing two example configurations of the user device 102, including at least two haptic actuators 114 coupled to opposite sides of the inner device 104, and receiving different control signals 124 or a same control signal 124. In example configurations 802 and 804, each of the haptic actuators 114 is coupled to at least a portion of an inner surface of the outer shell 110, and at least a portion of the inner shell 108. The displacements provided by the haptic actuators 114 may cause one or more displacements or motions of the inner device 104 relative to the outer shell 110, and the relative displacement(s) or motion(s) may provide the haptic effect(s) 120 that are perceivable by a user of the user device 102.

In the example configurations 802 and 804, the haptic actuators 114 are arranged to provide a displacement that is perpendicular to the surfaces to which they are coupled, as in the example configuration 702. Accordingly, the displacement(s) or motion(s) of the inner device 104 relative to the outer shell 110 may be in a transverse direction that is substantially parallel to a plane formed by at least a portion of the display 106.

In the example configurations 802 and 804, the haptic actuators 114 may receive one or more control signals 124 from the haptic controller 122. Although these examples depict a single haptic controller 122, implementations may employ multiple haptic controllers 122. In the example configuration 802, each of the haptic actuators 114 receives a different control signal 124 from the haptic controller 122. For example, the haptic actuator 114(1) may receive a control signal 124(1) from the haptic controller 122, and the haptic actuator 114(2) may receive a control signal 124(2) from the haptic controller 122.

In some cases, the different control signals 124 may be out of phase relative to each other. For example, as shown in the example configuration 802, the control signal 124(1) may be out of phase relative to the control signal 124(2). In cases where the control signals 124 are analog signals of a sinusoidal form, the different control signals 124 may have substantially opposite phase (e.g., approximately 180 degrees out of phase with one another), such that a peak in one waveform corresponds to a trough in the other waveform, and so forth. Such out of phase control signals 124 may signal substantially opposite behaviors in the haptic actuators 114. For example, the out of phase control signals 124 may cause the haptic actuator 114(1) to contract while the haptic actuator 114(2) expands, and may cause the haptic actuator 114(1) to expand while the haptic actuator 114(2) contracts. The corresponding, yet substantially opposite, behavior of the haptic actuators 114 may provide the relative motion or displacement of the inner device 104, generating the haptic effect(s) 120.

As shown in the example configuration 804, the haptic actuators 114 may receive a same control signal 124 from the haptic controller 122. In this example, the haptic actuator 114(1) may be arranged in a first orientation relative to the inner device 104 and the outer shell 110, and the haptic actuator 114(2) may be arranged in a second orientation that is substantially opposite to the first orientation. The opposite orientations of the haptic actuators 114 may provide for a substantially opposite behavior of the haptic actuators 114 in response to the same control signal 124. For example, on receiving the control signal 124, the haptic actuator 114(1) may expand while the haptic actuator 114(2) contracts. Such a response of the haptic actuators 114 may provide the relative motion or displacement of the inner device 104, generating the haptic effect(s) 120.

Figure 9:
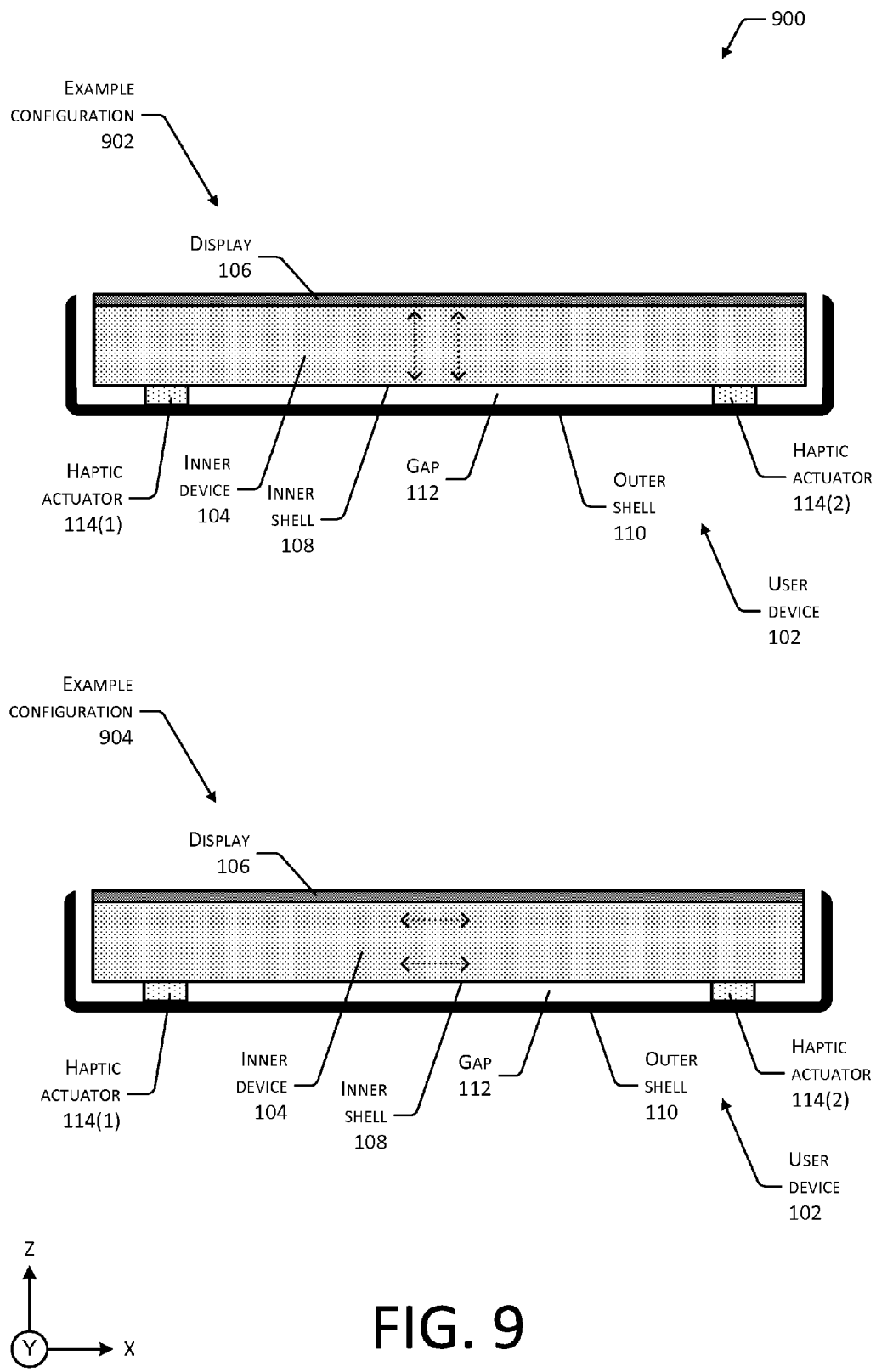
FIG. 9 depicts side views of the user device configured to present haptic effects through relative motion of an inner device and an outer shell, including one or more haptic actuators coupled to the side of the inner device that is opposite a display.

FIG. 9 depicts a schematic 900 showing two example configurations of the user device 102, including at least one or more haptic actuators 114. In example configurations 902 and 904, each of the haptic actuator(s) 114 is coupled to at least a portion of an inner surface of the outer shell 110, and is coupled to at least a portion of the inner shell 108 that is opposite the display 106. The displacements provided by the haptic actuator(s) 114 may cause one or more displacements or motions of the inner device 104 relative to the outer shell 110, and the relative displacement(s) or motion(s) may provide the haptic effect(s) 120 that are perceivable by a user of the user device 102.

In the example configuration 902, each of the haptic actuators 114 is arranged to provide a displacement that is substantially perpendicular to the surfaces to which it is coupled. Because the haptic actuators 114 are arranged to provide a substantially perpendicular displacement, the relative displacement(s) or motion(s) of the inner device 104 may be in a perpendicular direction that is substantially perpendicular to a plane formed by at least a portion of the display 106, e.g., in a Z direction as shown in FIG. 9.

In example configuration 904, each of the haptic actuators 114 is arranged to provide a displacement that is substantially parallel to the surfaces to which it is coupled. Because the haptic actuators 114 are arranged to provide a substantially parallel displacement, the relative displacement(s) or motion(s) of the inner device 104 may be in a transverse direction that is substantially parallel to a plane formed by at least a portion of the display 106, e.g., in a direction in the X-Y plane as shown in FIG. 9.

Figure 10:
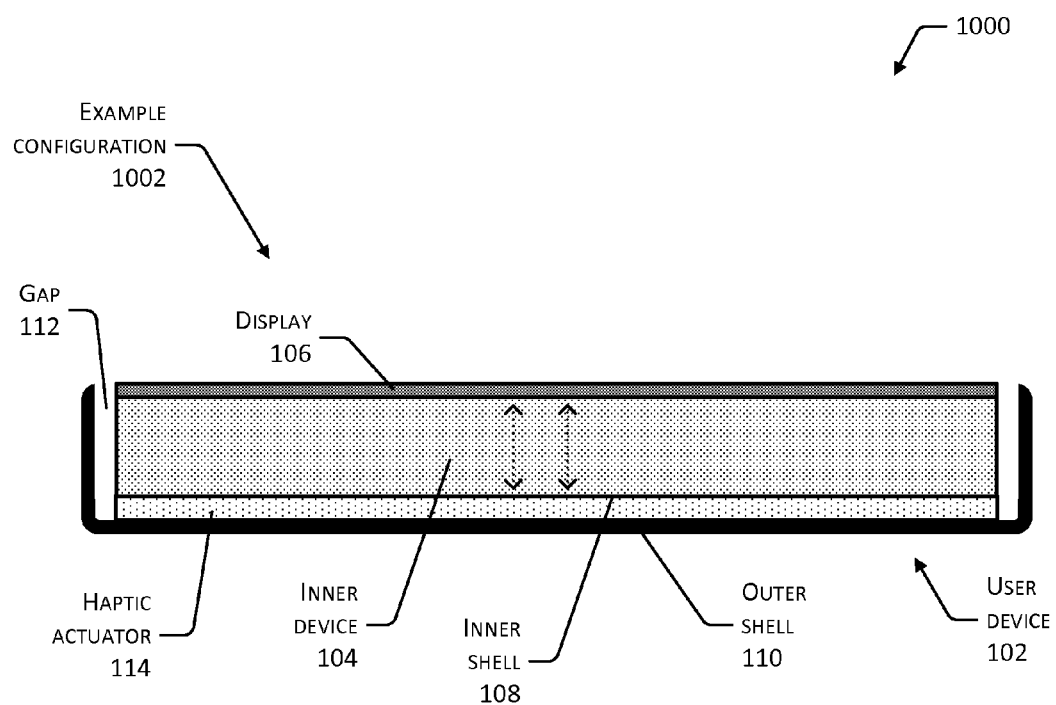
FIG. 10 depicts side views of the user device configured to present haptic effects through relative motion of an inner device and an outer shell, including at least one haptic actuator coupled to at least a portion of the side of the inner device that is opposite a display.
Figure 10:
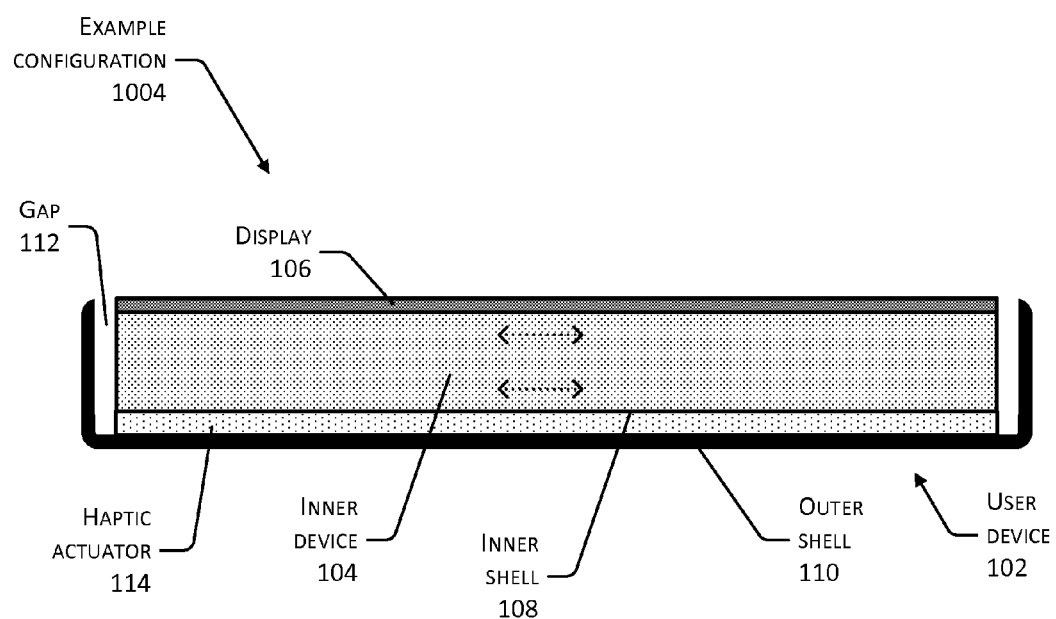
Figure 10:
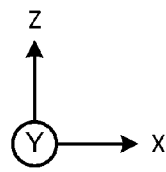

FIG. 10 depicts a schematic 1000 showing two example configurations of the user device 102, including at least one haptic actuator 114 coupled to at least a portion of a side of the inner device 104 that is opposite the display 106. In example configurations 1002 and 1004, the haptic actuator 114 is arranged to substantially cover the side of the inner device 104 that is opposite to the display 106. Alternatively, implementations may employ an array of haptic actuators 114 that substantially covers the side of the inner device 104 opposite to the display 106. The displacements provided by the haptic actuator 114 may cause one or more displacements or motions of the inner device 104 relative to the outer shell 110, and the relative displacement(s) or motion(s) may provide the haptic effect(s) 120 that are perceivable by a user of the user device 102.

In the example configuration 1002, the haptic actuator 114 is arranged to provide a displacement that is substantially perpendicular to the surfaces to which it is coupled. Because the haptic actuator 114 is arranged to provide a substantially perpendicular displacement, the relative displacement(s) or motion(s) of the inner device 104 may be in a perpendicular direction that is substantially perpendicular to a plane formed by at least a portion of the display 106, e.g., in a Z direction as shown in FIG. 10.

In example configuration 1004, the haptic actuator 114 is arranged to provide a displacement that is substantially parallel to the surfaces to which it is coupled. Because the haptic actuator 114 is arranged to provide a substantially parallel displacement, the relative displacement(s) or motion(s) of the inner device 104 may be in a transverse direction that is substantially parallel to a plane formed by at least a portion of the display 106, e.g., in an X direction or a Y direction as shown in FIG. 10.

In some implementations, the width of the gap 112 may be at least as wide as to enable clearance for the movements of the inner device 104. For example, where the inner device 104 is moving in a transverse direction as in the example configuration 1004, the gap 112 on the edges of the inner device 104 may have a width or dimension that is at least the range of motion of the inner device 104. Alternatively, where the inner device 104 is moving in a perpendicular direction as in the example configuration 1002, the gap 112 on the edges of the inner device 104 may be zero or negligible, given that there may be little or no transverse motion of the inner device 104 in such a configuration. Accordingly, the size of the gap 112 may differ on different sides of the inner device 104.

Although the examples shown in FIGS. 7-10 show particular configurations of the user device 102, each with a particular number and arrangement of haptic actuators 114, implementations are not limited to these examples. Implementations may employ any number of haptic actuators 114 in any arrangement or of any type, to generate the haptic effect(s) 120. For example, some implementations may employ any number of the haptic actuators 114 situated on an edge of the inner device 104 as shown in FIGS. 7 and 8, as well as any number of the haptic actuators 114 situated on the side of the inner device 104 opposite the display 106, as shown in FIGS. 9 and 10. Such arrangements may provide for movements of the inner device 104 relative to the outer shell 110, where such movements are in the X direction, the Y direction, the Z direction, or any combination of these directions.

In some implementations, the position of the haptic actuator(s) 114 may be based, at least in part, on the type of actuators used. For example, in cases where the haptic actuator(s) 114 are of the piezoelectric type (e.g., as shown in FIG. 5), the haptic actuator(s) 114 may be coupled to the edges of the inner device 104 as shown in FIGS. 1, 2, 7 and 8. Alternatively, in cases where the haptic actuator(s) 114 are of the electroactive polymer type (e.g., as shown in FIG. 4), the haptic actuator(s) 114 may be coupled to the side of the inner device 104 that is opposite from the display 106, as shown in FIGS. 9 and 10.

Figure 11:
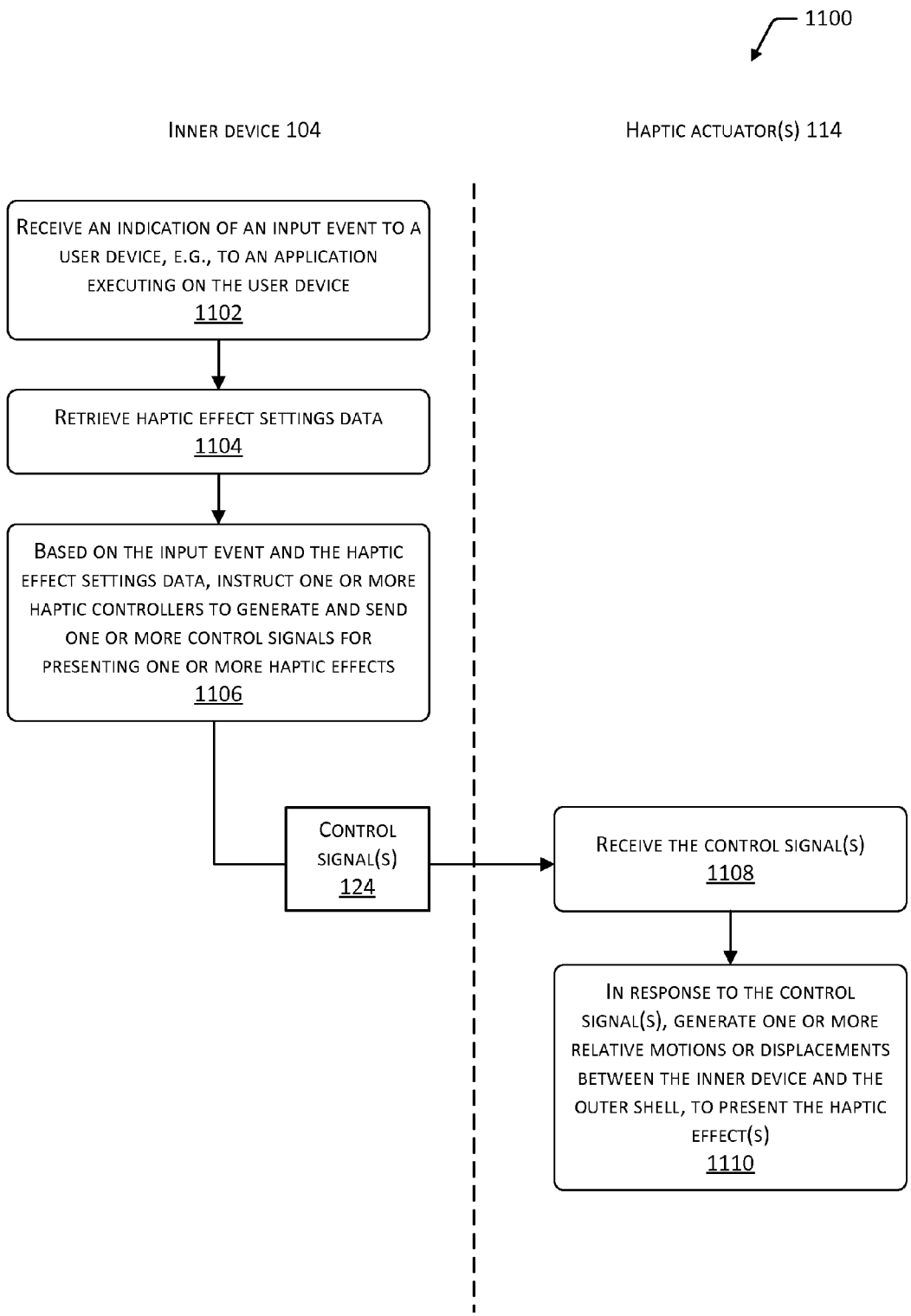
FIG. 11 depicts a flow diagram of a process for presenting haptic effects through one or more haptic actuators included in the user device, through a relative motion of an outer shell and an inner device.

FIG. 11 depicts a flow diagram 1100 of a process for presenting the haptic effects 120, by signaling the one or more haptic actuators 114 to generate a relative motion of the outer shell 110 and the inner device 104. The process includes operations performed by one or more components of the inner device 104, and operations performed by the haptic actuator(s) 114. In some implementations, the operations performed by the inner device 104 may be performed by the application(s) 118, the OS module 314, or other modules or components of the inner device 104.

At 1102, an indication is received of at least one input event to the user device 102 or the inner device 104. In some cases, inputs may be provided by a user through the display 106 or the touch input device(s) 306, and such inputs may generate one or more input events. The user input(s) may be provided to a user interface of the application(s) 118. One or more input events may also be generated based on other types of occurrences in the inner device 104. For example, input events may be generated based on communications from processes executing on other devices, or communications from processes or applications executing on the inner device 104. The input event(s) may be described by the input event data 116.

In some implementations, the haptic effect settings data 318 may be retrieved at 1104. As described above, in some implementations the inner device 104 may execute the haptic effect settings module 316, which may enable a user of the user device 102 to set preferences describing circumstances in which the haptic effect(s) 120 are to be presented based on the input event data 116.

At 1106, the haptic controller(s) 122 are instructed to generate and send the control signal(s) 124 to the haptic actuator(s) 114. In some cases, the particular control signal(s) 124 sent may be based on the haptic effect settings data 318. For example, the haptic effect settings data 318 may indicate a user preference for a particular type, intensity, or duration of haptic effect 120 to be presented under a particular set of circumstances such as time of day, location, which application 118 is active, and so forth. Further, in some implementations the particular haptic effect 120 to be presented may be based on one or more characteristics of the input event, such as a screen location, intensity, type of gesture (e.g., tap, swipe, or pinch), duration of the input, or other characteristics.

In some implementations, the control signal(s) 124 may be selected from a library of control signals, and sent to signal the haptic actuator(s) 114 to present one or more particular haptic effects 120. Moreover, in some implementations the particular haptic effect(s) 120 to be presented may determine which of multiple haptic actuators 114 are sent the control signal(s) 124. For example, a first haptic effect 120 may be presented based on a first control signal 124 sent to one or more haptic actuators 114 situated on an edge of the inner device 104 (as shown in FIGS. 7 and 8), and a second haptic effect 120 may be presented based on a second control signal 124 sent to one or more haptic actuators 114 situated on the side of the inner device 104 opposite the display 106 (as shown in FIGS. 9 and 10).

Moreover, in some implementations the haptic actuator(s) 114 may be configured to operate in different modes that are settable through the control signal(s) 124. For example, a haptic actuator 114 may have a first mode in which it generates motion in a transverse direction that is substantially parallel to the surface to which it is attached, and a second mode in which it generates motion in a perpendicular direction. In such cases, the control signal(s) 124 may instruct the haptic actuator 114 to operate in the first or second mode to provide different types of movement and thus generate different haptic effects 120.

At 1108, the control signal(s) 124 are received at the haptic actuator(s) 114. At 1110, in response to the control signal(s) 124, the haptic actuator(s) 114 may generate one or more motions or displacements of the inner device 104 relative to the outer shell 110 as described above, to present the haptic effect(s) 120.

Figure 12:
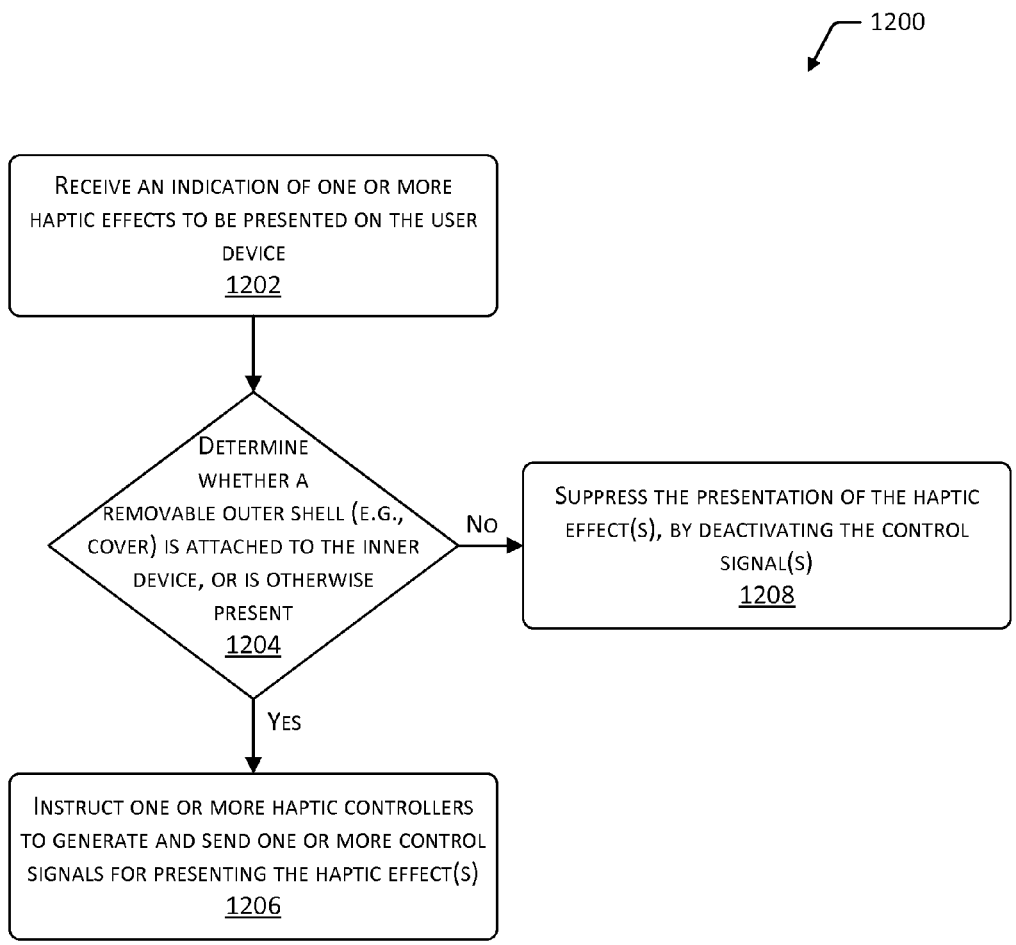
FIG. 12 depicts a flow diagram of a process for determining whether to send one or more control signals to present haptic effects, based on whether a removable outer shell is present.

FIG. 12 depicts a flow diagram 1200 of a process for determining whether to send the one or more control signals 124 to instruct the haptic actuators 114 to present the haptic effects 120. The determination of whether to send the control signal(s) 124 may be based on whether a removable case is attached to the inner device 104 or is otherwise present. The process includes operations performed by one or more components of the inner device 104. In some implementations, the operations performed by the inner device 104 may be performed by the application(s) 118, the OS module 314, or other modules or components of the inner device 104.

In some implementations, the outer shell 110 and the haptic actuator(s) 114 may be incorporated into a removable cover or case. The inner shell 108 that substantially encloses the inner device 104 may include, on its outer surface, one or more electrically conductive contacts or connection points that may couple to the one or more haptic actuators 114 when the removable cover is attached to the inner device 104. Such contacts or connection points may be electrically coupled to the haptic controller(s) 122 or other internal components of the inner device 104 through one or more vias or ports that pass through the inner shell 108, enabling the control signal(s) 124 to be sent to the haptic actuator(s) 114 when the removable cover is present.

When the removable cover, including the outer shell 110, is not present, implementations may disable the sending of the control signal(s) 124 to avoid shock or discomfort to the user who may be in physical contact with the electrical contacts or connection points that would otherwise carry the control signal(s) 124. Accordingly, implementations may enable a user of the user device 102 to attach the removable cover to enable the presentation of the haptic effect(s) 120, and to remove the removable cover to disable the presentation of the haptic effect(s) 120. In some implementations, the removable cover or case at least partly encloses the inner device 104 as described above with regard to the outer shell 110.

At 1202, an indication is received of one or more haptic effects to be presented on the user device 102. In some cases, this indication may be based on receiving at least one input event to the user device 102 as described above.

At 1204, a determination is made whether a removable cover, including the outer shell 110, is in contact with the inner device 104 or is otherwise present. In some implementations, the removable cover may include one or more magnets, and the determination of the presence of the removable cover may be based on the detection of a magnetic field generated by the proximity of the magnets. Alternatively, the determination of the presence of the removable cover may be based on measuring an electrical resistance or capacitance across the electrical couplings or connection points, where the resistance or capacitance varies based on the presence or absence of the removable cover and the outer shell 110. Implementations support other methods for detecting the presence of the removable cover, including the use of a camera or infrared (IR) sensor to detect light or heat energy differences due to the presence or absence of the cover. In some implementations, the removable cover may include a radio frequency identification (RFID) device, or other near-field radio frequency device, and the presence of the removable cover may be determined based on signals received from such a device.

When it is determined at 1204 that the removable cover is attached, the process may proceed to 1206. At 1206, the haptic controller(s) 122 may be instructed to generate and send the control signal(s) 124, to instruct the haptic actuator(s) 114 to present the haptic effect(s) 120 as described above. Alternatively, when it is determined at 1204 that the removable cover is not attached, the process may proceed to 1208. At 1208, the haptic controller(s) 122 may not be instructed to send the control signal(s) 124, or the control signal(s) 124 may be otherwise deactivated. In this way, the presentation of the haptic effect(s) 120 may be at least partly suppressed or disabled when the removable cover is not present.

Those having ordinary skill in the art will recognize that certain structures or features illustrated in the figures above may be eliminated, combined, subdivided, or arranged in various configurations, positions, and orientations to implement the various techniques described above. Accordingly, the figures above should be viewed as examples and should not be viewed as limiting of implementations.

Further, those having ordinary skill in the art will also readily recognize that certain steps or operations illustrated in the figures above can be eliminated, combined, subdivided, executed in parallel, or taken in an alternate order. Moreover, the methods described above may be implemented as one or more software programs for a computer system and are encoded in one or more computer-readable storage media as instructions executable on one or more processors. Separate instances of these programs may be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system, comprising:
an inner computing device, including:
a display arranged on a side of the inner computing device, the display coupled to a touch input device;
a haptic controller electrically coupled to one or more haptic actuators, wherein the haptic controller is configured to send a control signal to instruct the one or more haptic actuators to present a haptic effect;
a memory storing computer-executable instructions; and
a processor in communication with the memory, the display, the touch input device, and the haptic controller, the processor configured to execute the computer-executable instructions to cause the processor to:
receive an input event based on an input to the touch input device; and
based on the input event, send the control signal from the haptic controller to the one or more haptic actuators;
an outer shell, arranged to cover two or more sides of the inner computing device while enabling access to the display; and
the one or more haptic actuators, each of the one or more haptic actuators mechanically coupling an inner surface of the outer shell to an outer surface of the inner computing device, the one or more haptic actuators configured to:
receive the control signal from the haptic controller; and
based on the control signal, displace the inner computing device with respect to the outer shell to present the haptic effect.

2. The system of claim 1, wherein the displacement produced by the one or more haptic actuators comprises a linear motion along a single axis.

3. The system of claim 1, wherein the one or more haptic actuators couple the inner computing device to the outer shell, such that the inner computing device is an unsprung mass of the one or more haptic actuators, and such that the outer shell is a sprung mass of the one or more haptic actuators.

4. The system of claim 3, wherein the one or more haptic actuators comprise at least two linear haptic actuators that are on opposite sides of the inner computing device, the at least two linear haptic actuators comprising:
a first haptic actuator arranged in a first orientation relative to the inner device; and
a second haptic actuator arranged in a second orientation relative to the inner device, the second orientation being opposite to the first orientation.

5. A system, comprising:
an inner device, including:
a memory storing computer-executable instructions; and
a processor in communication with the memory, the processor configured to execute the computer-executable instructions to cause the processor to:
send, to one or more haptic actuators, one or more control signals to present a haptic effect;
an outer shell, arranged to cover one or more sides of the inner device; and
the one or more haptic actuators, wherein the one or more haptic actuators mechanically couple the inner device to the outer shell, the one or more haptic actuators configured to:
receive the one or more control signals; and
based on the one or more control signals, generate a displacement of the inner device relative to the outer shell to present the haptic effect.

6. The system of claim 5, wherein:
the inner device further comprises a touch input device in communication with the processor;
the outer shell is arranged to cover two or more sides of the inner device while enabling access to the touch input device; and
the processor is further configured to:
receive an indication of an input to the touch input device; and
send the one or more control signals in response to the input.

7. The system of claim 6, wherein:
the inner device further comprises a display coupled to the touch input device; and
the displacement of the inner device is in a direction parallel to a plane defined by two longest axes of the display.

8. The system of claim 5, further comprising a removable cover that includes the outer shell and the one or more haptic actuators, wherein:
the removable cover is configured to decouple from the inner device; and
the sending of the one or more control signals is deactivated while the removable cover is decoupled from the inner device.

9. The system of claim 5, wherein:
the inner device further comprises a display;
the one or more haptic actuators are coupled to the inner device on a side of the inner device that is opposite to the display;
the one or more haptic actuators are substantially planar; and
the one or more haptic actuators are configured to generate the displacement of the inner device in a transverse direction relative to the display.

10. The system of claim 9, wherein the one or more haptic actuators include two haptic actuators that are coupled to the outer shell on opposite sides of the inner device, the two haptic actuators comprising:
a first haptic actuator arranged in a first orientation relative to the inner device; and
a second haptic actuator arranged in a second orientation relative to the inner device, the second orientation being opposite to the first orientation; and
wherein the first and second haptic actuators are configured to generate the displacement of the inner device relative to the outer shell in response to a same control signal of the one or more control signals.

11. The system of claim 9, wherein:
the one or more haptic actuators include two haptic actuators that are coupled to the outer shell on opposite sides of the inner device;
the one or more control signals include a first control signal and a second control signal;
the second control signal has a phase that is substantially opposite relative to the first control signal; and
sending the one or more control signals further comprises:
sending the first control signal to a first one of the two haptic actuators; and
sending the second control signal to a second one of the two haptic actuators.

12. The system of claim 5, wherein the displacement of the inner device relative to the outer shell is in a direction that is parallel to a plane defined by two longest axes of the inner device.

13. The system of claim 5, wherein the displacement of the inner device relative to the outer shell is in a direction that is perpendicular to a plane defined by two longest axes of the inner device.

14. The system of claim 5, wherein the one or more haptic actuators comprise at least one of a piezoelectric actuator, an electroactive polymer actuator, or an inertial mass actuator.

15. An apparatus, comprising:
   an inner shell, arranged to enclose one or more electronic components, including at least one electronic component configured to send a control signal to one or more haptic actuators;
   an outer shell, arranged to enclose two or more sides of the inner shell; and
   the one or more haptic actuators, each of the one or more haptic actuators directly coupled to an inner surface of the outer shell and to an outer surface of the inner shell, the one or more haptic actuators configured to:
      receive the control signal from the at least one electronic component; and
      based on the control signal, present a haptic effect by displacing the inner shell with respect to the outer shell.

16. The apparatus of claim 15, wherein:
   the inner shell includes a display;
   the one or more haptic actuators are coupled to the inner shell on a side of the inner shell that is opposite to the display;
   the one or more haptic actuators are substantially planar; and
   the one or more haptic actuators are configured to generate the displacement of the inner device in a transverse direction relative to the display.

17. The apparatus of claim 15, wherein the one or more haptic actuators include two haptic actuators that are coupled to the outer shell on opposite sides of the inner shell, the two haptic actuators comprising:
   a first haptic actuator arranged in a first orientation relative to the inner shell; and
   a second haptic actuator arranged in a second orientation relative to the inner shell, the second orientation being opposite to the first orientation.

18. The apparatus of claim 15, wherein:
   the one or more haptic actuators include two or more haptic actuators that are coupled to the outer shell on opposite sides of the inner shell;
   the two or more haptic actuators are configured to receive two or more control signals, including a first control signal and a second control signal;
   the second control signal has a phase that is substantially opposite relative to the first control signal;
   at least a first one of the two or more haptic actuators is arranged to receive the first control signal; and
   at least a second one of the two or more haptic actuators is arranged to receive the second control signal.

19. The apparatus of claim 15, wherein the displacement between the inner shell and the outer shell is in a transverse direction that is parallel to a plane defined by two longest axes of the inner shell.

20. The apparatus of claim 15, wherein the displacement between the inner shell and the outer shell is in a perpendicular direction that is perpendicular to a plane defined by two longest axes of the inner shell.

* * * * *